M. M. WALLACE.
CONNECTING MEMBER.
APPLICATION FILED OCT. 18, 1916.
1,243,018.
Patented Oct. 16, 1917.
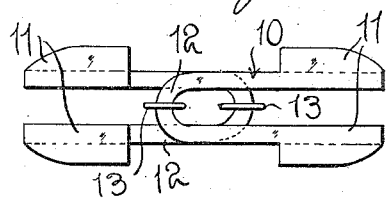
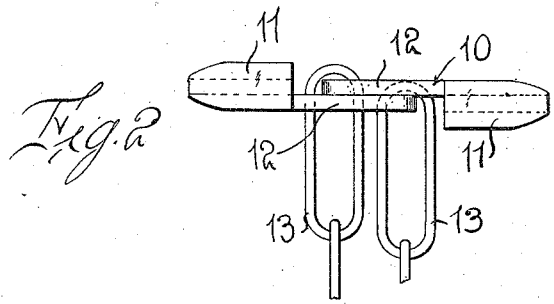
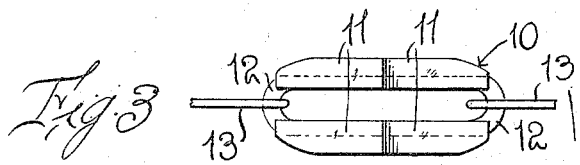
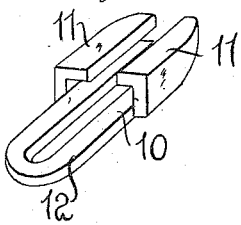
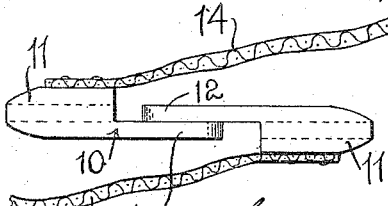
Inventor
M. M. WALLACE
By Watson E. Coleman
Attorney

UNITED STATES PATENT OFFICE.

MILTON M. WALLACE, OF AGUA DULCE, TEXAS.

CONNECTING MEMBER.

1,243,018.   Specification of Letters Patent.   Patented Oct. 16, 1917.

Application filed October 18, 1916.   Serial No. 126,353.

*To all whom it may concern:*

Be it known that I, MILTON M. WALLACE, a citizen of the United States, residing at Agua Dulce, in the county of Nueces and State of Texas, have invented certain new and useful Improvements in Connecting Members, of which the following is a specification, reference being had to the accompanying drawings.

This invention relates to devices in the nature of links or buckles, whereby two elements may be detachably engaged or connected to each other and particularly to a connecting member formed of two light cooperating sections adapted to have detachable interlocking engagement with each other.

The general object of my invention is the provision of a device of this character which in one form is particularly adapted for repairing chains or linking chains to each other and which may be modified so as to be used as buckles or for a variety of other purposes such as hitching tugs to swingletrees, connecting machinery belts, or as belt buckles for waist belts.

A further object of the invention is the provision of a device of this kind formed of two sections or link members which are duplicates of each other whereby only one form of link member may be made and then two link members joined together to form a complete link or buckle.

Other objects will appear in the course of the following description.

My invention is illustrated in the accompanying drawings, wherein—

Figure 1 is a top plan view of a connecting member constructed in accordance with my invention, showing the two sections of the connecting member opened out.

Fig. 2 is a side elevation of the construction shown in Fig. 1;

Fig. 3 is a top plan view of the connecting member in its closed and locked position;

Fig. 4 is a section on the line 4—4 of Fig. 3;

Fig. 5 is a perspective view of one of the sections of the connecting member; and Fig. 6 is a side elevation showing the device adapted for fastening the ends of a belt.

Referring to these figures it will be seen from Fig. 1 that my device comprises two interlocked connecting members. These members are exactly like each other. Each member comprises a body 10 formed to provide an open loop, where the device is to be used for connecting chains for instance. At the open end of the loop the body is provided with oppositely disposed outwardly, upwardly and inwardly extending flanges constituting guides 11 which project upward from one face of the body. That portion of the body which projects beyond the guides constitutes a tongue 12 which is adapted to be inserted and have sliding engagement in the guides of a complementary member. One of the sections of the complete connecting member is illustrated in Fig. 5.

Now when it is desired to form a link from two members constructed as in Fig. 5, or to connect the two linking or fastening members to each other, the tongues are disposed, as illustrated in Fig. 2, against each other, the guides on one member facing in the opposite direction from the guides on the other member and with the open ends of the loops extending in opposite directions. The members are then slidingly engaged with each other and pushed up until the inner ends of the guides abut against each other when the members will have the position shown in Fig. 3. It is, of course, to be undertsood that the links 13 or the chain to be connected, in case the device is to be used for connecting broken chains or connecting two lengths of chains, are to be threaded each upon one of the loops.

With the parts disposed as illustrated in Fig. 3, it is obvious that a pull in opposite directions upon the links 13 will cause the abutments 11 to press against each other and it is impossible to open the link formed of the two members. This link will be as strong or stronger than any other links of the chain. If it be desired to disconnect the links 13 or open the connecting member, the two sections of the connecting member are shifted away from each other until the tongues are disconnected from the guides, as illustrated in Figs. 1 and 2, whereupon the sections of the connecting member may be disconnected or unthreaded from the link.

While in Figs. 1 to 5 I have illustrated my device as particularly applied to forming a connecting link whereby to connect up two portions of chain, yet I wish it understood that it may be used for other purposes and that the form of the device may be varied without departing from the principles thereof. Devices of this character may be used as harness buckles or belt buckles and be used for hitching tugs to swingletrees, connecting machinery belts, etc. In Fig. 6 I show how the device may be used for connecting belts, as for instance waist belts. The sections of the connecting member are constructed in exactly the same manner as the device shown in Fig. 5 except that the tongue is not slotted and the belt sections 14 are attached to the faces of the guides. It will be obvious that the device may be varied in many ways without departing from the spirit of the invention and that it may be made of any suitable material consistent with the work to be done.

Having described my invention, what I claim is:

1. As an article of manufacture, a connecting member comprising a tongue having guide flanges at one end thereof and overhanging one face of the tongue, the tongue being adapted to be inserted in the guides of a similar member and the guides being adapted to receive the tongue of the similar member.

2. A connecting member comprising two complementary sections, each section having a tongue and guides overhanging one face thereof at one end of the tongue, the tongues of the sections being faced against each other and the tongue of each section inserted in the guides of the other section with the ends of the guides abutting against each other.

3. A connecting member comprising coöperating half loops, each half loop having guides at its open end and on one face for engagement with the other loop, said guides constituting abutments when the loops are engaged with each other, and with the guides.

4. A connecting member consisting of two complementary sections, each comprising a longitudinally extending flat tongue and oppositely disposed tongue guides formed on one face of the tongue at one end thereof, the tongues of the sections being faced against each other and the tongue of one section inserted in the guides of the other section with the ends of the guides abutting against each other.

5. A connecting member comprising two complementary sections, each section comprising a body formed with a flat longitudinally extending open loop constituting a tongue, said body at the open end of the loop being formed with oppositely disposed guides on one face of the body, the tongues of the sections being faced against each other, and the tongue of one section inserted in the guides of the other section with the ends of the guides abutting against each other.

6. A connecting member comprising two complementary sections, each section having a tongue and a guide having a passage extending entirely through it, the tongues of the sections being disposed in parallel relation with the tongue of each section inserted through the guide of the other section, and with the ends of the guides abutting against each other and the tongues extending in opposite directions beyond said guides.

In testimony whereof I hereunto affix my signature in the presence of two witnesses.

MILTON M. WALLACE.

Witnesses:
JOE SPEAR,
FRANK E. WALLACE.

Copies of this patent may be obtained for five cents each, by addressing the "Commissioner of Patents, Washington, D. C."